United States Patent
Das et al.

(10) Patent No.: US 8,989,799 B2
(45) Date of Patent: *Mar. 24, 2015

(54) METHODS OF REVERSE LINK POWER CONTROL

(71) Applicant: Alcatel-Lucent, Paris (FR)

(72) Inventors: Suman Das, Colonia, NJ (US); Shirish Nagaraj, Cedar Knolls, NJ (US); Harish Viswanathan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/245,103

(22) Filed: Apr. 4, 2014

(65) Prior Publication Data

US 2014/0219172 A1 Aug. 7, 2014

Related U.S. Application Data

(63) Continuation of application No. 11/355,977, filed on Feb. 17, 2006, now Pat. No. 8,712,460.

(51) Int. Cl.
*H04B 7/00* (2006.01)
*H04W 52/24* (2009.01)
*H04W 52/14* (2009.01)

(52) U.S. Cl.
CPC .......... *H04W 52/243* (2013.01); *H04W 52/146* (2013.01); *H04W 52/241* (2013.01); *H04W 52/247* (2013.01)
USPC ............... 455/522; 455/69; 455/70; 370/315; 370/316; 370/317; 370/318; 370/319

(58) Field of Classification Search
USPC ................................ 455/69–70, 522; 370/318
See application file for complete search history.

(56) References Cited

U.S. PATENT DOCUMENTS

| 6,307,849 | B1 | 10/2001 | Tiedemann, Jr. |
| 6,587,696 | B1 * | 7/2003 | Ma et al. ............... 455/522 |

(Continued)

FOREIGN PATENT DOCUMENTS

| CN | 1126930 A | 7/1996 |
| EP | 0682418 A2 | 11/1995 |

(Continued)

OTHER PUBLICATIONS

Examiner's Office Letter Dated Mar. 21, 2012, issued in Japanese Patent Application No. 2008-555323 and English translation thereof.

(Continued)

*Primary Examiner* — Fayyaz Alam
(74) *Attorney, Agent, or Firm* — Harness, Dickey & Pierce (57) ABSTRACT

Methods of reverse link power control are provided. In one example embodiment, a signal-to-interference+noise (SINR) is measured for a plurality of mobile stations. A power control adjustment is determined for each of the mobile stations based on the measured SINR for the mobile station and a fixed target SINR, the fixed target SINR being used in the determining step for each mobile station and sending the power control adjustments to the mobile stations. In another example embodiment, one or more signals are transmitted to a base station. A power control adjustment indicator indicating an adjustment to a transmission power level is received. The received power control adjustment is determined based on a measured signal-to-interference+noise ratio (SINR) for the one or more transmitted signals and a fixed target SINR threshold, the fixed target SINR threshold being used for power control adjustment of a plurality of mobile stations.

10 Claims, 5 Drawing Sheets

(56) References Cited

U.S. PATENT DOCUMENTS

| | | |
|---|---|---|
| 6,628,957 B1 | 9/2003 | Weaver et al. |
| 6,690,944 B1 | 2/2004 | Lee et al. |
| 6,968,201 B1 | 11/2005 | Gandhi et al. |
| 2005/0143120 A1 | 6/2005 | Cave et al. |
| 2008/0132267 A1* | 6/2008 | Cave et al. .................... 455/522 |

FOREIGN PATENT DOCUMENTS

| | | |
|---|---|---|
| EP | 1311076 A1 | 5/2003 |
| JP | 2002-026747 A | 1/2002 |
| JP | 2002531992 A | 9/2002 |
| JP | 2004088271 A | 3/2004 |
| JP | 2005159577 A | 6/2005 |
| JP | 2007525103 A | 8/2007 |
| KR | 10-2001-0021080 A | 3/2001 |
| WO | WO-0033480 A1 | 6/2000 |
| WO | 10-2001-0023790 A | 3/2001 |
| WO | WO-2004059875 A1 | 7/2004 |
| WO | WO-2004-093343 A1 | 10/2004 |
| WO | WO-2005034383 A2 | 4/2005 |

OTHER PUBLICATIONS

Examiner's Refusal Decision dated Mar. 14, 2013 for related Japanese Application No. 2008-555323 (full translation provided).

Taiwanese Office Action dated Mar. 29, 2013 for related Taiwanese Application No. 096106362 (full translation provided).

Chinese Office Action dated Jun. 5, 2012, issued in Chinese Application No. 200780005614.7 and English translation thereof.

Office Action for corresponding Israeli Application No. 193389 dated Jan. 19, 2012.

International Search Report and Written Opinion dated Jul. 3, 2007.

Office Action for corresponding Japanese Application No. 2013-147316 dated May 29, 2014 and English translation thereof.

Office Action for corresponding Chinese Application No. 200780005614.7 dated Dec. 16, 2014 and English translation thereof.

* cited by examiner

FIG. 1

CONVENTIONAL CDMA SYSTEM

METHODS OF REVERSE LINK POWER CONTROL

PRIORITY STATEMENT

This application is a continuation of U.S. patent application Ser. No. 11/355,977 filed on Feb. 17, 2006, the contents of which is incorporated by reference in its entirety.

BACKGROUND OF THE INVENTION

1. Field of the Invention

Example embodiments of the present invention relate generally to communications systems, and, more particularly, to wireless communication systems.

2. Description of the Related Art

Figure 1:
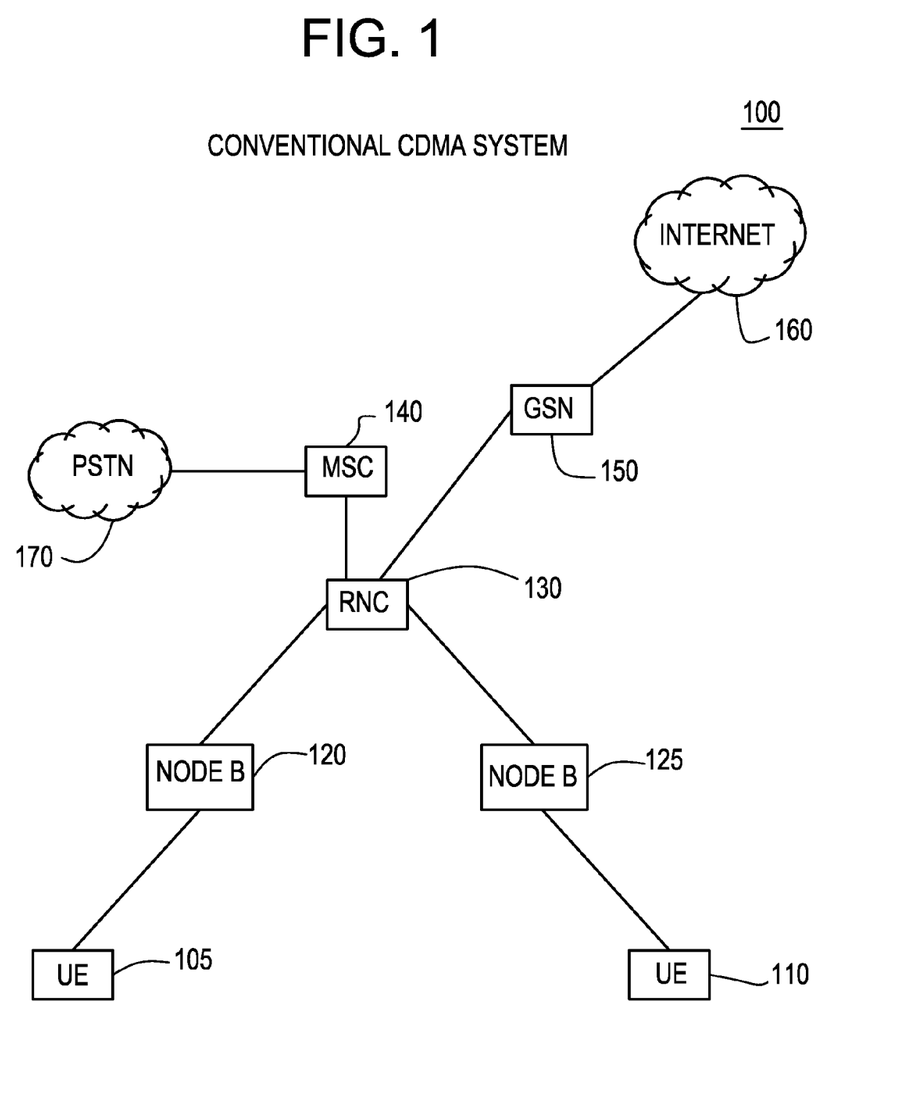
FIG. 1 illustrates a conventional Code Division Multiple Access (CDMA) system.

FIG. 1 illustrates a conventional Code Division Multiple Access (CDMA) 100. The CDMA system includes a plurality of user equipments (UEs) 105 in communication with one or more serving Node Bs 120/125 over an air interface. The plurality of Node Bs are connected to a radio network controller (RNC) 130 with a wired interface. Alternatively, while not shown in FIG. 1, the functionality of both the RNC 130 and Node Bs 120/125 (alternatively referred to as "base stations") may be collapsed into a single entity referred to as a "base station router". The RNC 130 accesses an internet 160 through a gateway support node (GSN) 150 and/or accesses a public switched telephone network (PSTN) 170 through a mobile switching center (MSC) 140.

Referring to FIG. 1, in the CDMA system 100, a power control mechanism is typically used to minimize power consumption and interference while maintaining a desired level of performance. Conventionally, this power control mechanism is implemented with two power control loops. The first power control loop (often referred to as an "inner" power control loop, or "inner loop") adjusts the transmit power to each mobile station or UE 105/110 such that the signal quality of the transmission received at the UE receiver (e.g., as measured by a signal-to-noise ratio) is maintained at a target signal-to-interference+noise (SINR) ratio, or target $E_b/N_0$. The target SINR or $E_b/N_0$, where $E_b$ is the energy per information bit, and $N_0$ is the power spectral density of the interference seen by the receiver, is often referred to as a power control set point, or threshold. The second power control loop (often referred to as an "outer" power control loop, or "outer loop") adjusts the threshold such that the desired level of performance, e.g., as measured by a particular target block error rate (BLER), frame error rate (FER), or bit error rate (BER) for example, is maintained.

For example, for link (e.g., forward link or reverse link) power control, the inner loop compares a measured SINR or $E_b/N_0$ of the received signal to the target SINR or target threshold. The SINR of the received signal is periodically measured, for example, at 1.25 ms interval. If the measured SINR or $E_b/N_0$ is smaller than the threshold, there may be too many decoding errors when the receiver is decoding frames of a received transmission, such that the FER is outside an acceptable range (i.e., too high). Accordingly, the receiver requests an increase in power on the link. If the measured SINR or $E_b/N_0$ is larger than the threshold, the receiver requests a decrease in power on the link. Here, the decoded transmission may contain little or no errors, thus the system may be too efficient (FER is far below the acceptable range) and transmit power is being wasted.

The outer loop surrounds the inner loop and operates at a much lower rate than the inner loop, such as at 20 ms intervals, for example. The outer loop maintains the quality of service (QoS) of the link. The outer loop establishes and updates the SINR threshold, which is responsive to changing channel/environmental conditions. The outer loop looks at quality of the link, and if the quality is too poor, the outer loop increases the threshold accordingly. Alternatively, if the link quality is too good, (e.g., an FER less than a target FER of about 1% voice transmissions, higher for data transmissions), the outer loop readjusts the threshold so as not to unduly waste system resources. In view of this, the target SINR is said to be adaptive. And, because this process is performed for each link, each receiver has its own adaptive target SINR such that the target SINRs of different receivers (e.g., UE receivers) differ.

Figure 2:
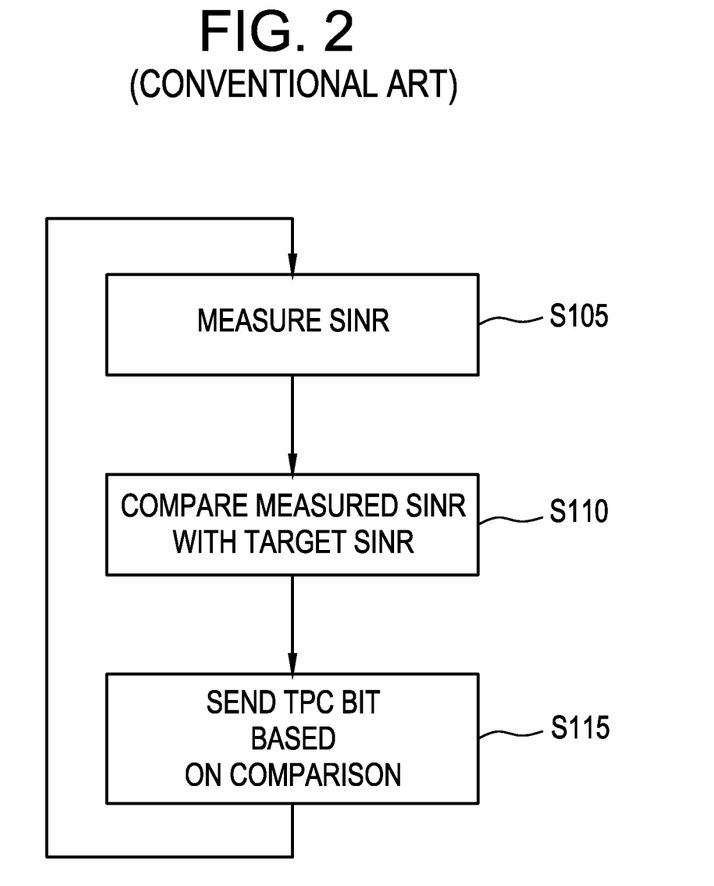
FIG. 2 illustrates a conventional inner loop CDMA reverse link power control process.

FIG. 2 illustrates a conventional inner loop CDMA reverse link power control process. The process of FIG. 2 is described below as performed with respect to the reverse link from the UE 105 to the Node B 120. However, it is understood that the process of FIG. 2 is representative of a conventional CDMA reverse link power control between any UE in connection with any Node B.

Referring to FIG. 2, at the inner loop, the Node B (e.g., Node B 120) measures the SINR for pilot transmissions received from a UE (e.g., UE 105) in step S105. The measured SINR measurement (step S105) is either a pre- or post-interference cancellation (IC) measurement. In an example, if the measurement of the pilot SINR is performed with post-interference cancellation, the Node B 120 measures the pilot SINR prior to interference cancellation, and then measures the residual interference-to-total interference ratio after the interference cancellation. The ratio of these two quantities is a measure of the post-interference cancellation SINR.

The Node B 120 compares the measured pilot SINR with an adaptive target SINR in step S110. The adaptive SINR target is previously set by the outer loop at the RNC 130 so as to satisfy a level of Quality of Service (QoS), reflected by an expected packet error rate (PER) or FER, for each served UE (e.g., UE 105, 120, etc.). The adaptive SINR target is not the only factor affecting the QoS, however, and the adaptive SINR is set with a consideration of such other factors so as to more accurately tune to the desired level of QoS. For example, another factor potentially affecting the QoS is a traffic-to-pilot ratio (TPR) at the UE 105. The TPR at the UE 105 is fixed, and does not "adapt" as described above with respect to the adaptive target SINR. Here, "fixed" TPR means that, for a given transfer rate, the TPR is set to a constant value and does not change.

The Node B 120 sends a transmit power control (TPC) bit to the UE 105 in step S115. A TPC bit is a single bit binary indicator, which is set to a first logic level (e.g., a higher logic level or "1") to instruct a UE (e.g., UE 105) to increase transmission power by a fixed amount and a second logic level (e.g., a lower logic level or "0") to instruct a UE (e.g., UE 105) to decrease transmission power by the fixed amount. In an example, if the comparison of step S110 indicates that the measured pilot SINR is less than the adaptive target SINR, the Node B 120 sends a TPC bit having the first logic level (e.g., a higher logic level or "1") to the UE 105. Otherwise, the Node B 120 sends a TPC bit having the second logic level (e.g., a lower logic level or "0") to the UE 105. After the Node B 120 sends the TPC bit to the UE 105 in step S115, the process returns to step S105.

In a further example, the frequency at which the Node B 120 measures (step S105) the pilot SINR, compares the measured pilot SINR with the adaptive target SINR (step S110) and sends TPC bits (step S 115) may be based on a desired "tightness" of power control as determined by a system engineer.

While the process of FIG. 2 is being performed at the Node B 120, at the outer loop, the RNC 130 periodically determines whether to adjust the adaptive target SINR based on an analysis of the inner loop communications. This determination may be based on a number of criteria. For example, the RNC 130 decreases the adaptive target SINR if the PER or FER is relatively low (e.g., very few non-acknowledgments (NACKs) are sent to the UE 105 indicating failed transmissions) so as to satisfy a given level of QoS. In another example, the RNC 130 increases the adaptive target SINR if the PER is relatively high (e.g., too many NACKs are being sent to the UE 105) so as to satisfy a given level of QoS. The RNC 130 then updates the adaptive target SINR used by the Node B 120 in the process of FIG. 2 in accordance with the determined adjustment.

SUMMARY OF THE INVENTION

An example embodiment of the present invention is directed to a method of controlling reverse link transmission power in a wireless communications network, including measuring a signal-to-interference+noise (SINR) for a plurality of mobile stations, determining a power control adjustment for each of the mobile stations based on the measured SINR for the mobile station and a fixed target SINR, the fixed target SINR being used in the determining step for each mobile station and sending the power control adjustments to the mobile stations.

Another example embodiment of the present invention is directed to a method of controlling reverse link transmission power in a wireless communications network, including transmitting one or more signals to a base station and receiving a power control adjustment indicator indicating an adjustment to a transmission power level, the received power control adjustment having been determined based on a measured signal-to-interference+noise ratio (SINR) for the one or more transmitted signals and a fixed target SINR threshold, the fixed target SINR threshold being used for power control adjustment of a plurality of mobile stations.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

CDMA Reverse Link Power Control

A CDMA reverse link power control process according to an example embodiment of the present invention will be described below with respect to the conventional CDMA system 100 of FIG. 1. More specifically, the embodiment will be described below as performed with respect to the reverse link from the UE 105 to the Node B 120. However, it is understood that the embodiment may also be representative of CDMA reverse link power control between any UE in connection with any Node B. Furthermore, it will be appreciated that the processes of the present invention are not limited to the CDMA system of FIG. 1.

In the outer loop, the RNC 130 selects a fixed target SINR or $E_b/N_0$ system. As will be described below, the fixed target SINR is fixed for all UEs within the CDMA system 100, and is used in the inner loop for evaluating measured pilot SINRs in order to determine whether transmission power adjustments should be made. In an example, the fixed target SINR may be set in conjunction with an initial traffic-to-pilot ratio or TPR to maintain expected CDMA control channel error rates below an error rate threshold. Error rates (e.g., a frame error rate (FER), a packet error rate (PER), etc.) reflect a Quality of Service (QoS) provided to the UE 105. As discussed in the Background of the Invention section, the target SINR and the TPR are two factors which potentially affect the QoS for the UE 105. Here, the RNC 130 sets the fixed target SINR and the TPRs based on offline link level curves for each served UE conservatively such that the UEs, including the UE 105, are very likely to attain a threshold QoS level. The setting of "initial" values for the target SINR and the TPRs is well known in the art. However, while conventional inner- and outer-loops and the outer-loop power control mechanisms adjust the SINR target to satisfy a level of QoS while maintaining the TPR at a constant level at given rates for all UEs, as will be described below, an example embodiment of the present invention is directed to maintaining the target SINR at a constant level while adapting the TPR for each served UE.

Figure 3:
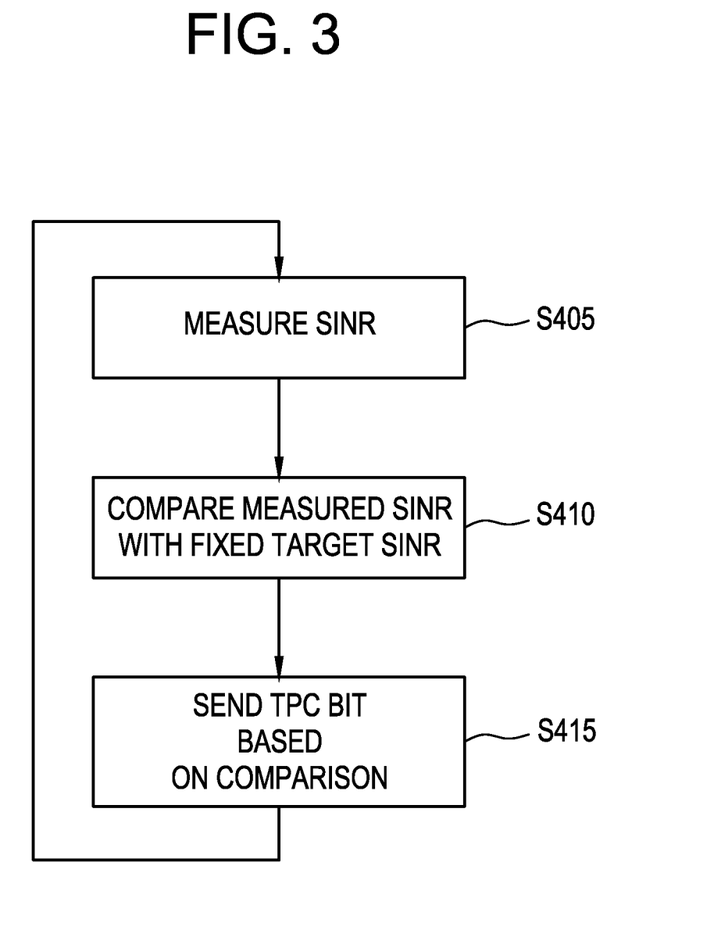
FIG. 3 illustrates a CDMA reverse link power control process according to an example embodiment of the present invention.

The inner loop power control performed at, for example, a Node B such as Node B 120, is illustrated in FIG. 3. As shown, the Node B 120 measures an SINR for a pilot signal received from the UE 105 in step S405. The measured SINR measurement (step S405) is either a pre- or post-interference cancellation (IC) measurement. In an example, if the measurement of the pilot SINR is performed with post-interference cancellation, the Node B 120 measures the pilot SINR prior to interference cancellation, and then measures the residual interference-to-total interference ratio after the interference cancellation. The ratio of these two quantities is a measure of the post-interference cancellation SINR.

The Node B 120 compares the measured pilot SINR with the fixed target SINR in step S410. The Node B 120 sends a transmit power control (TPC) bit to the UE 105 in step S415. The TPC bit is a single bit binary indicator which is set to a first logic level (e.g., a higher logic level or "1") to instruct a UE (e.g., UE 105) to increase transmission power by a fixed amount and a second logic level (e.g., a lower logic level or "0") to instruct a UE (e.g., UE 105) to decrease transmission power by the fixed amount. In an example, if the comparison of step S410 indicates that the measured pilot SINR is less than the fixed target SINR, the Node B 120 sends a TPC bit having the first logic level (e.g., a higher logic level or "1") to the UE 105. Otherwise, the Node B 120 sends a TPC bit having the second logic level (e.g., a lower logic level or "0") to the UE 105. In a further example, the frequency at which the Node B 120 measures (step S405), compares the measured pilot SINR with the fixed target SINR (step S410) and sends the TPC bit (step S415) may be based on a desired "tightness" of power control as determined by a system engineer.

Figure 4:
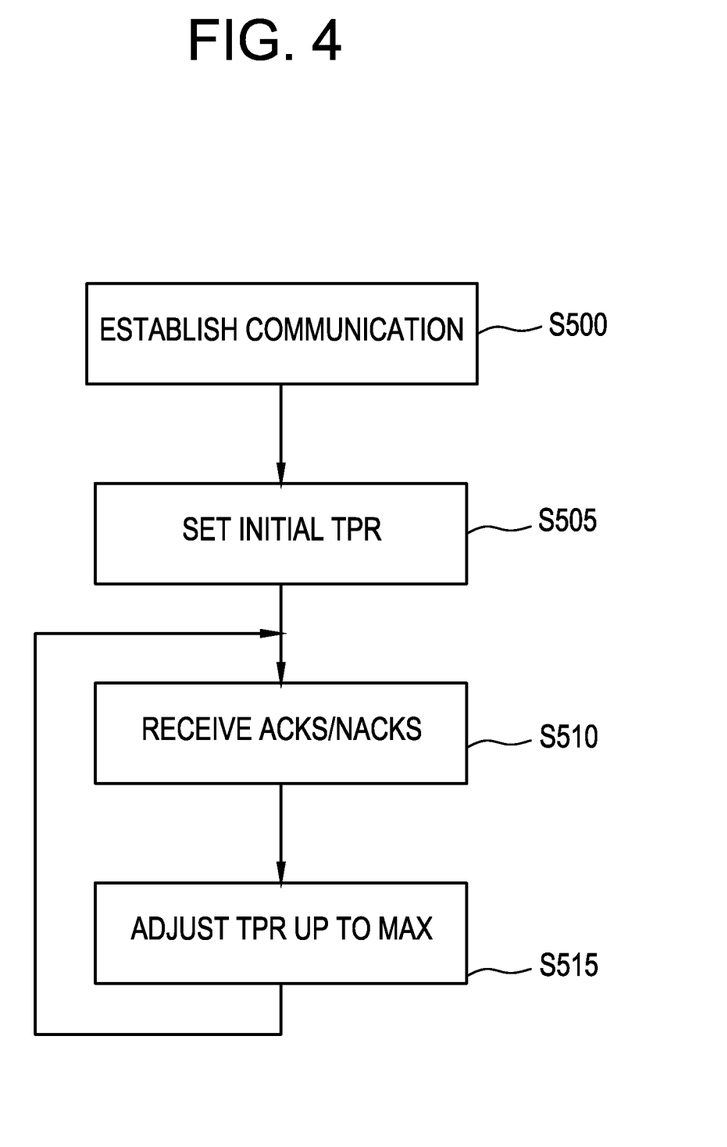
FIG. 4 illustrates a CDMA reverse link power control process according to another example embodiment of the present invention.

FIG. 4 illustrates a CDMA reverse link power control process according to another example embodiment of the present invention. The process of FIG. 4 illustrates steps performed at, for example the UE 105. In an example, the UE 105 may be served by the Node B 120 operating in accordance with the process of FIG. 3.

As shown in FIG. 4, in step S500, the UE 105 establishes communication with the Node B 120 using well-known methods. While data is being transferred between the UE 105 and the Node B 120, the Node B 120 will periodically send acknowledgments (ACKs) and non-ACKs (NACKs) to the UE 105 to indicate successful or unsuccessful transmissions from the UE 105. CDMA transmissions typically include a pilot channel, a plurality of control channels (e.g., for sending channel quality indicators (CQIs), etc.) and a plurality of traffic channels. The plurality of control channels and the pilot channel do not typically receive error feedback (e.g., ACKs/NACKs). Rather, error feedback is typically isolated to the CDMA traffic channels.

Accordingly, since error feedback for the control channels is not provided under current CDMA protocols, a conservative initial traffic-to-pilot ratio (TPR) is set in step S505 such that error rates for the plurality of control channels are expected to remain below an error rate threshold. The TPR multiplied by the power level of the pilot signal of the UE 105 is the power level for transmissions on traffic channels of the UE 105. As discussed above, the initial TPR may be set in conjunction with the target SINR to conservative levels in order to maintain the control channel error rates below the error rate threshold. As discussed in the Background of the Invention section, the target SINR and the TPR are two factors which potentially affect the QoS for the UE 105. The RNC 130 sets the fixed target SINR and the initial TPRs for each served UE conservatively such that the UEs, including the UE 105, are very likely to attain a threshold QoS level, as reflected by FER, PER, etc. In an example, the initial TPR may be a system designer's "best guess" for a good starting point for an adaptive TPR. The value of the initial TPR is not critical for the operation of the process of FIG. 4 because, as will be discussed below, the initial TPR is updated or adjusted to reflect and respond to actual operating conditions.

The UE 105 receives ACKs/NACKs from the Node B 120 in response to data packets transmitted to the Node B 120 in step S510. Based on the received ACKs/NACKs, the UE 105 determines whether the actual, current error rate is below the error rate threshold in step S515. As discussed above, the initial TPR is set (step S505) based on an expected error rate. Thereafter, the TPR is adjusted by the UE 105 in step S515 based on actual operating conditions. If the actual operating conditions indicate that the error rate is above the error rate threshold (e.g., worse than expected), the TPR is increased (e.g., by a first fixed amount) in step 515. For example, if the UE 105 attempts to transmit a given data packet n or more times without a receiving an ACK, the TPR is increased by the first fixed amount. Alternatively, if the actual operating conditions indicate that the error rate is below the error rate threshold (e.g., better than expected), the TPR is decreased (e.g., by a second fixed amount) in step S515. For example, if a given data packet is transmitted by the UE 105 and acknowledged within n attempts, the TPR is decreased by the second fixed amount. For example, if the requirement is that the error rate after 4 HARQ attempts is x=1%, then we set the TPR_downstep/TPR_upstep=x/(1−x). In this case, whenever a packet succeeds in less than 4 attempts, the TPR is decreased by TPR_downstep, and if it fails after 4 attempts, the TPR is increased by TPR_upstep.

However, it is understood that the transmit power levels set by the TPR may have both physical constraints and software constraints. A physical constraint of the transmit power level set by the TPR is an actual physical transmission threshold (i.e., a maximum transmission power level for the UE 105 at its highest power settings). A software constraint is an artificial maximum transmit power level (e.g., hereinafter referred to as a "maximum transmit power per chip threshold") typically set by the outer loop so as to reduce overall system interference by not allowing all users to transmit at their highest possible levels. An example of establishing the maximum transmit power per chip threshold is described later with respect to FIG. 5. After the TPR is adjusted in step S515, the process returns to step S510 and awaits additional ACKs/NACKs from the Node B 120.

In another example embodiment of the present invention, referring to FIG. 4, the continual adjustment of the TPR in step S515 for Hybrid-ARQ (HARQ) channels may allow a target PER or QoS to achieve a given threshold after a given number of transmissions based on the ACKs/NACKs received in step S510.

In another example embodiment of the present invention, referring to FIG. 4, if the UE 105 is engaged in soft handoff (e.g., with Node Bs 120 and 125), the UE 105 receives ACKs/NACKs on multiple legs (e.g., from multiple Node Bs) and the determination of the actual error rate in step S515 is thereby based on ACKs/NACKs in a plurality of sectors. In this case, the TPR adjustment performed in step S515 is based on the ACKs/NACKs received from the Node Bs 120/125 involved in the soft handoff.

Numerous advantages of the "fixed" target SINR as opposed to the conventional adaptive target SINR will be readily apparent to one of ordinary skill in the art. For example, a SINR target update procedure, conventionally performed at the outer loop (e.g., at RNC 130), need not be performed. Thereby, numerous frames conventionally devoted to the SINR target update procedures may be used for other purposes. The processing conventionally performed by the outer loop or RNC 130 is offloaded onto the UE 105 in example embodiments of the present invention because the UE 105, when engaged in soft handoff, uses the ACKs/NACKs from all Node Bs 120/125 in its active set (e.g., a set of Node Bs with which the UE 105 communicates with during soft handoff) to determine whether to adjust the TPR, in contrast to the outer loop or RNC 130 determining whether to adjust the target SINR.

While the example CDMA reverse link power control process was described as implemented within the conventional CDMA system 100 of FIG. 1, the CDMA reverse link power control process may alternatively be applied in any system capable of operating in accordance with CDMA protocols, such as a hybrid Orthogonal Frequency Division Multiple Access (OFDMA)/CDMA system.

In another example, while not described in this application, maintaining the fixed target SINR may simplify OFDMA reverse link power control because the CDMA measured pilot SINR (e.g., which may be used in an OFDMA reverse link power control process) may be predicted with greater accuracy at the UE 105.

In another example, the above-described CDMA reverse link power control process may be employed at an interference cancellation receiver because the TPRs at the UEs (e.g., UE 105) may be adjusted in step S520 to account for interference at a plurality of traffic channels.

Maximum Mobile Station Transmit Power

An example of establishing a maximum power per chip threshold for the UE 105's transmissions will now be described. In an example, UEs located near edges or boundaries of cells (e.g., between Node B 120 and Node B 125) have more affect on neighboring cell's interference as compared to UEs located in close proximity to a serving Node B (e.g., near a centered position of the cell). If no control is maintained on the peak power with which a given UE may transmit, overall system interference may increase. The following example of establishing a peak power per chip or maximum transmit power level for a UE within the conventional CDMA system 100 is given as a function of the UE's location with respect to a plurality of cells. Further, while the below example embodiments are described with respect to the UE 105 having the Node B 120 as a serving Node B and the Node B 125 as a neighboring Node B, this particular arrangement is given for example purposes only and it will be readily apparent that the below maximum transmit power per chip control process may alternatively be applied at any UE within the CDMA system 100.

Each of the Node Bs (e.g., Node Bs 120, 125, etc.) within the CDMA system 100 periodically measures an amount of received outer-cell interference (e.g., interference from cells other than a Node B's own cell). Each of the Node Bs compares the measured outer-cell interference with an outer-cell interference threshold $Io_{thresh}$. In an example, the RNC 130 may set the outer-cell interference threshold $Io_{thresh}$ for the Node Bs 120/125 Each of the k Node Bs transmits (e.g., to all UEs within range, such as the UE 105) an Interference Activity Bit (IAB) based on the comparison. In an example, referring to a Node B "p", if the comparison indicates that the measured outer-cell interference is greater than the outer-cell interference threshold $Io_{thresh}$, then IAB(p)=1, wherein Node B p is representative of one of the Node Bs within the CDMA system 100. Otherwise, if the comparison indicates that the measured outer-cell interference is not greater than the outer-cell interference threshold $Io_{thresh}$, then IAB(p)=0. It is understood that the IABs may be transmitted from one or more Node Bs at once such that multiple IABs may be received by a UE within the CDMA system 100, in part based on the UE's position relative to neighboring or serving Node Bs within the CDMA system 100. A maximum transmit power per chip threshold adjustment process, performed at the UEs within the CDMA system 100, taking into account the IABs transmitted by the Node Bs will now be described below with respect to a representative UE 105 in FIG. 5.

Figure 5:
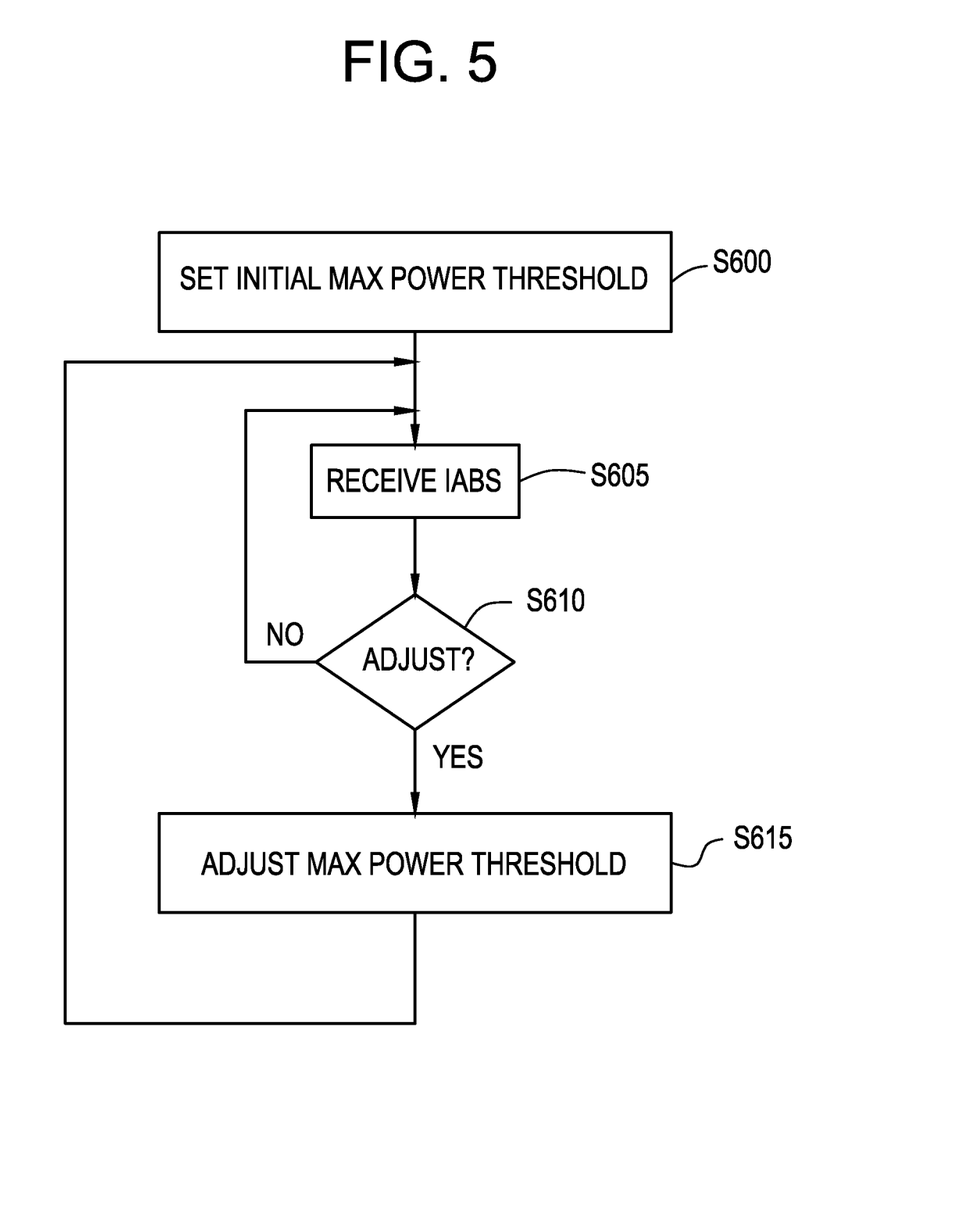
FIG. 5 illustrates a process of establishing a maximum transmit power per chip threshold for a mobile station's transmissions according to an example embodiment of the present invention.

FIG. 5 illustrates a process of establishing a maximum transmit power per chip threshold for a UE's transmissions according to an example embodiment of the present invention. The example embodiment of FIG. 5 is described below with respect to a representative UE (e.g., UE 105) and k Node Bs (e.g., Node B 120, 125, etc.) within the conventional CDMA system 100, wherein k is an integer greater than or equal to 1. The steps illustrated in FIG. 5 and described below are performed at, for example, the UE 105 of FIG. 1. The representative UE 105 is not necessarily in active communication with more than one of the k Node Bs (e.g., although it may be, such as in soft handoff mode), but the representative UE 105 is capable of "listening" to or receiving signals from all of the k Node Bs. Accordingly, it will be appreciated that the number k may vary based on the UE 105's position within the CDMA system 100. For example, if the UE 105 is in very close proximity to a serving Node B such as Node B 120, k typically equals 1. As the UE 105 becomes closer to an edge of a cell, k is typically greater than 1.

In the example embodiment of FIG. 5, in step S600, the maximum transmit power per chip threshold of the UE 105 being served by the Node B 120 is initialized, by the UE 105, to $$P_{max}(1)=Io_{thresh}/\max(G(d)), d=1,\ldots,k \quad \text{Equation 3}$$

wherein $P_{max}(1)$ denotes a maximum power for an initial time period, $Io_{thresh}$ denotes an outer-cell interference threshold (e.g., an amount of outer-cell interference that can be tolerated), and G(d) denotes an average channel gain from the UE 105 to a dth Node B among the k Node Bs, wherein d is an integer from 1 to k. In an example, the G(d) measurements are based on SINR measurements on the common pilot and preamble, and the outer-cell interference threshold $Io_{thresh}$ is determined by a design engineer.

The UE 105 receives the IABs (discussed above prior to FIG. 5) from each of the k Node Bs in step 605 and determines whether an adjustment to the maximum transmit power per chip threshold is required in step S610. If step S610 determines that an adjustment is necessary, a power adjustment is calculated for the UE 305 in step S615. Otherwise, the process returns to step S605. In step S615, the UE 105 establishes a token bucket for the transmission power resource called $Pc_{bucket}(t)$, which denotes the instantaneous updated value of the transmit power resource based on the received IABs, expressed as $$Pc_{bucket}(t)=Pc_{bucket}(t-1)-\Delta P_{down} \quad \text{Equation 4}$$

if any of the IABs received by the UE 105 are set to "1", wherein $\Delta P_{down}=w^* \max(G(y))$, wherein y denotes y Node Bs among the k Node Bs which are sending the IAB equal to "1" at time t, and w is a fixed weight factor determined by a design engineer.

$Pc_{bucket}(t)$ is alternatively expressed as $$Pc_{bucket}(t)=Pc_{bucket}(t-1)+\Delta P_{up} \quad \text{Equation 5}$$

if all of the IABs received by the UE 105 are set to "0", wherein "t" denotes a current time period and "t−1" denotes a previous time period, and $\Delta P_{up}$ is expressed by $$\Delta P_{up}=[x/(1-x)]\Delta P_{down}$$

wherein x is equal to the probability that the outer-cell interference measured by a given Node B is greater than the outer-cell interference threshold $Io_{thresh}$. In an example, the probability "x" is based on a coverage requirement for the given Node B (e.g., Node B 120). In a further example, the probability "x" is determined during deployment or installation of the CDMA system 100.

$P_{bucket}(t)$ is an averaged version of $Pc_{bucket}(t)$, and is expressed as $$P_{bucket}(t)=P_{bucket}(t-1)+Pc_{bucket}(t)-P_{max}(t-1) \quad \text{Equation 6}$$

$P_{max}(t)$ evaluates to $$P_{max}(t)=\min(P_{max}(t-1), P_{bucket}(t)) \quad \text{Equation 7}$$

if a new encoder packet is scheduled for transmission from the UE 105 to the Node B 120, and $$P_{max}(t)=P_{bucket}(t)-P_{margin} \quad \text{Equation 8}$$

if a new encoder packet is not scheduled for transmission, wherein $P_{margin}$ is an offset value which is greater than or equal to 0 to ensure the bucket does not become empty during the transmission of the encoder packet. In an example, a data rate for the new encoder packet is selected such that $P_{max}(t)$ is set to a sufficient power level so as to achieve a threshold level of spectral efficiency.

Once the maximum transmit power per chip threshold $P_{max}(t)$ is set in accordance with one of Equations 7 and 8 in step S615, the process returns to step S605.

Accordingly, with the above example methodology described with respect to FIG. 5, one of ordinary skill in the art will appreciate that UEs closer to a greater number of Node Bs (e.g., further away from a serving Node B and closer to cell edges) adjust the maximum transmit power per chip threshold with larger steps, whereas UEs closer in proximity to the serving Node B react more slowly to the IAB bits. The combination of the pilot reference power (Po(t)) and the maximum allowed data/pilot power per chip may be used in the computation of the spectral efficiency as requested by the UE.

Example embodiments of the present invention being thus described, it will be obvious that the same may be varied in many ways. For example, while above-described with respect to a conventional CDMA wireless communication system, it will be appreciated that the above-described CDMA reverse link power control methodology can be alternatively applied to any wireless communication system operating in accordance with CDMA (e.g., a hybrid OFDMA/CDMA system).

Further, it is understood that a Node B and a UE may alternatively be referred to as a base station (BS) and a mobile station (MS) or mobile unit (MU), respectively.

Such variations are not to be regarded as a departure from the example embodiments of the invention, and all such modifications are intended to be included within the scope of the invention.

We claim:

1. A device comprising:
   a memory with instructions stored theron; and
   a processor configured to execute the instructions stored on the memory to,
   measure a signal-to-interference+noise (SINR) for a plurality of mobile stations;
   determine a power control adjustment for each of the plurality of mobile stations based on the measured SINR for the mobile station, a fixed target SINR and a variable traffic-to-pilot ratio (TPR), the fixed target SINR being used for each of the plurality of mobile stations; and
   send the power control adjustments to the plurality of mobile stations for controlling reverse link transmission power in a wireless communications network.

2. The device of claim 1, wherein each power control adjustment is represented by an associated transmission power control (TPC) bit.

3. The device of claim 1, wherein the processor is further configured to select the fixed target SINR so as to maintain error rates on a communication channel in the wireless communications network, below an error rate threshold.

4. The device of claim 1, wherein the processor is configured to determine the power control adjustment by comparing the measured SINR with the fixed target SINR, wherein each of the determined power control adjustments instructs a corresponding one of the plurality of mobile stations to increase a transmission power level if the measured SINR is less than the fixed target SINR and instructs the corresponding one of the plurality of mobile stations to decrease the transmission power level if the measured SINR is not less than the fixed target SINR.

5. The device of claim 1, wherein the processor is further configured to,
   measure outer-cell interference; and
   transmit a first interference indicating signal indicating whether the measured outer-cell interference exceeds an outer-cell interference threshold.

6. The device of claim 1, wherein the wireless communications system is a Code Division Multiple Access (CDMA) system.

7. The device of claim 1, wherein the wireless communication system is a hybrid Orthogonal Frequency Division Multiple Access (OFDMA)/ Code Division Multiple Access (CDMA) system.

8. The device of claim 1, wherein the device is a base station.

9. The device of claim 1, wherein the processor is configured to set an initial value for the variable TPR.

10. The device of claim 1, wherein the processor is configured to,
    receive updated TPR values from the plurality of mobile stations, and
    modify the variable TPR based on a corresponding one of the received updated TPR values.

* * * * *